United States Patent
Huang et al.

(10) Patent No.: US 6,350,606 B1
(45) Date of Patent: Feb. 26, 2002

(54) MICROFLORA COMPOSITIONS FOR USE IN THE PRODUCTION OF UNCOOKED STINKY TOFU (CHAW-TOFU)

(75) Inventors: Wei-Hsun Huang; Shwu-Fen Lee; Shou-Chin Yu; Yu-Chen Liu; Fwu-Ling Lee, all of Hsinchu (TW)

(73) Assignee: Food Industry Research and Development, Hsinchu (TW)

( * ) Notice: Subject to any disclaimer, the term of this patent is extended or adjusted under 35 U.S.C. 154(b) by 0 days.

(21) Appl. No.: 09/523,073

(22) Filed: Mar. 10, 2000

Related U.S. Application Data

(63) Continuation-in-part of application No. 09/289,827, filed on Apr. 12, 1999, now Pat. No. 6,106,873.

(30) Foreign Application Priority Data

Dec. 17, 1998 (CN) .......................................... 87121043

(51) Int. Cl.[7] ................................. C12N 1/20
(52) U.S. Cl. .................................. 435/252.4
(58) Field of Search .......................... 435/252.1, 252.4, 435/252.5, 252.9; 426/52, 46, 61, 643, 634

(56) References Cited

PUBLICATIONS

Yuan–Chi Su, "Traditional Fermented Foods in Tawain", Proceedings Oriental Fermented Foods, p. 15 & 27, FIRDI, Tawain, Jan. 1980.*

Lai, M.N., Production of Chaw–Tofu, *Food Industry*, 20(3):25–26, Jan. 1996.*

Lee, S.F., Wang, C.B., and Chang, P.P., *Food Science*, 23(1):1–9, Jan. 1996.*

Steinkraus, K.H., "Indigenous Fermented Foods Involving an Alkaline Fermentation" pp. 349–362, Jan. 1995.*

Wang, J. and Fung. DYC., "Alkaline–fermented foods: a review with emphasis on pidan fermentation" Crit. Rev. Microbiol. 22:101, Jan. 1996.*

* cited by examiner

*Primary Examiner*—Keith Hendricks
(74) *Attorney, Agent, or Firm*—Olson & Hierl, Ltd.

(57) ABSTRACT

The present invention relates to isolated standard microflora designated as A2 and S3 for use in producing uncooked stinky tofu which were obtained by screening, isolation and identification from conventional stinky brine. The invention further relates to particular brine mixture compositions suitable for the growth of microflora A2 or S3, for use in producing fermented aromatic (stinky) brine which can be used to produce uncooked stinky tofu.

2 Claims, No Drawings

MICROFLORA COMPOSITIONS FOR USE IN THE PRODUCTION OF UNCOOKED STINKY TOFU (CHAW-TOFU)

CROSS-REFERENCE TO RELATED APPLICATIONS

This application claims is a continuation in part of U.S. Pat. application Ser. No. 09/289,827, filed Apr. 12, 1999, now issued as U.S. Pat. No. 6,106,873.

FIELD OF THE INVENTION

The present invention provides an isolated, standard microflora suitable for the repeatable and consistent production of uncooked stinky tofu (Chaw-Tofu), a aromatic (stinky) fermentation brine composition for producing uncooked stinky tofu suitable for the growth of the microflora, and the method for producing uncooked stinky tofu by using the microflora and aromatic fermentation brine composition.

BACKGROUND OF THE INVENTION

Stinky tofu is a special fermented food product found in Taiwan, amongst other places. Stinky tofu is considered by many Chinese to be a particularly flavorful and delicious dish. The conventional stinky tofu is produced through an open fermentation process which comprises curing ingredients such as vegetables and shrimp etc. by salt in the natural environment; allowing the putrefaction of the ingredients, and thus obtain a stinky brine (the aromatic fermentation liquid for stinky tofu); immersing and fermenting tofu (ie. soybean curd) in the stinky brine for 4–6 hours; and recovering said tofu from brine (Su, Y. C. Traditional fermented foods in Taiwan, In *Proceedings of the Oriental Fermented Foods*, p.15, Food Industry Research and development Institute, Taiwan, Hsinchu, 1980). The fermented stinky tofu, usually cut into squares, is then cooked prior to consumption.

Stinky tofu is obtained by an alkaline fermentation. During the fermentation process, microorganisms are able to hydrolyze proteins to amino acids and peptides, accompanied by the release of ammonia and a subsequent increase of pH of the fermenting mixture. The main microorganism responsible for the alkaline fermentation are Bacillus sp. Most of the microorganisms are capable of secreting extracellular enzymes to hydrolyze proteins to amino acids and peptides and release ammonia during the fermentation (Wang, J. and Fung, D.Y.C., Alkaline-fermented foods: a review with emphasis on pidan fermentation. *Crit. Rev. Microbial.* 22:101, 1996).

The strains of microorganisms conventionally used for fermentation of stinky tofu are mainly from the stinky brine, which is inoculated by chance from the environment and ingredients. Therefore, the quality, and consistency of product is not predictable; for example, the flavor of the product is varied depending on each batch of the brine, even if the brine is made comprising the same ingredients. In addition, in the conventional production of stinky brine, the ingredients are only roughly cut, then mixed, and thus not easily degraded by the microorganisms. Thus, the growth of the microorganisms is slow. In general, it takes more than six months to complete the fermentation process to produce stinky brine. Owing to the conventional use of open fermentation, the odor produced in the fermentation attracts insects, which then gather and lay eggs in the fermenting mixture. Thus, using conventional methods sanitation is very poor. A variety of pathogenic fungal infectious agents harmful to human health could also easily contaminate the fermenting mixture. Thus, it would be most useful to develop a sanitary method for producing uncooked stinky tofu, that is repeatable and produces consistent quality of product, as well as allows for improved food safety and product handling.

SUMMARY OF THE INVENTION

One objective of the invention is to provide an isolated standardized microflora suitable for the repeatable and consistent production of uncooked stinky tofu. Such standardized microflora is isolated from the environment and characterized for desired fermentation of brine. The standardized microflora allows for the production of uncooked stinky tofu having good flavor and sanitation.

The invention thus provides for a standardized microflora which is identified as A2 and mainly comprises Bacillus sp., Enterococcus sp. and Lactobacillus sp.

The invention thus further encompasses an isolated microflora suitable for making stinky brine for use in the production of stinky tofu, where said microflora comprises the species of microorganism found in the A2 microbial group, which include *Bacillus sphaericus, Enterococcus gallinarum*, Corynebacterium sp., *E. faecium, Lactobacillus pentosus, L. fermentum* and *L. casei*.

The invention also provides for a standardized microflora identified as S3 which mainly comprises Bacillus sp. and Enterococcus sp.

Thus the invention further encompasses an isolated microflora suitable for making stinky brine for the production of stinky tofu, where said microflora comprises the species of microorganism found in the S3 microflora group, including *Bacillus sphaericus, Enterococcus avium, Enterococcus casselifavus* and *Enterococcus durans*.

An additional objective of the invention is to provide a standardized brine mixture for use in producing uncooked stinky tofu, such brine being particularly suitable for the efficient growth of the standardized isolated microflora of the invention, and methods for the preparation of such brine. The present invention also encompasses the specific aromatic fermented (stinky) brine produced by fermenting the standardized brine mixture of the invention with the appropriate isolated standardized microflora of the invention.

Another objective of the invention is to provide a method for producing uncooked stinky tofu which utilizes said microflora and brine mixture composition. The uncooked stinky tofu can be used for the production of the edible stinky tofu by cooking process methods such as steaming, cooking, frying and stewing with soy sauce.

BRIEF DESCRIPTION OF THE INVENTION

One object of the invention is to provide an isolated standard microflora suitable for the production of stinky tofu.

Lai, et al. has studied the production of stinky tofu and the general screening of microorganisms for brewing stinky tofu based on the capability of hydrolyzing protein (Lai, M. N., Production of Chaw-Tofu, *Food Industry* 9:3 pp.25–26, 1997). The bacteria capable of hydrolyzing protein are isolated from conventional stinky brines wherein the most common of the microorganisms strains are *B. megaterium, B. polymyxa, B. pumilus* and *B. subtilis*, in which the later two strains are the major strains for fermentation (Lee, S. F., Wang, C. B., and Chang, P. P., The Isolation and Identification of Protein hydrolyzing Bacteria from Chaw-Tofu, *Food Science* 23:1, 1996).

However, it was found that the fermentation of the brine using only a single strain of microorganism was not good, and did not yield satisfactory results. Accordingly, the present invention teaches an isolated standard microflora comprising at least two microorganisms, for fermentation, said microflora being isolated and standardized by screening and identification from stinky brine produced by conventional methods. This microflora comprises more than one bacterial species which is able to withstand freezing using standard microbiology methods. It was found that two isolated and standardized microflorae, named the A2 microbial group and S3 microbial group, were suitable for making consistent quality product.

The microflora of the invention were isolated and standardized by collecting stinky brine samples produced by conventional means from various places in Taiwan, diluting and plating the collected stinky brine samples with a stinky odor, and selecting the desired microflora. It was found that the A2 microbial group mainly comprises Bacillus sp., Enterococcus sp. and Lactobacillus sp. and the S3 microbial group mainly comprises Bacillus sp. and Enterococcus sp. Particular species found in the A2 microbial group include *Bacillus sphaericus, Enterococcus gallinarum*, Corynebacterium sp., *E. faecium, Lactobacillus pentosus, L. fermentum* and *L. casei*. Particular species found in the S3 microbial group include *Bacillus sphaericus, Enterococcus avium, Enterococcus casselifavus* and *Enterococcus durans*.

One method for the identification of the microflora was conducted by the Microbial Identification System (Miller, L. and Berger, J. Bacteria Identification by Gas Chromatography of Whole Cell Fatty Acids, *HP Application Note* 288:41, 1985). According to the standard operation steps and analysis methods, the fatty acid methylated esters (FAMES) are prepared by collecting bacterial cells, saponification, methylation, extraction and washing with an alkaline solution. The resulting FAMES are analyzed with a Hewlett-Packard model HP 5890A gas chromatography which was equipped with a capillary column, a flame ionization detector, a 7673B automatic sampler, and a 3396B Integrater. Identification of the FAME fingerprints of isolates were performed using the MIDI database.

The A2 microbial group mainly comprises *Bacillus sphaericus,* Enterococcus sp. and Lactobacillus sp., and frozen samples of the isolated standard A2 microflora was deposited on Dec. 8, 1998 with China Center For Type Culture Collection (CCTCC; Wuhan University, Wuhan 430072 P.R. China) under the Budapest Treaty and assigned accession number M98023. The S3 group mainly comprises *Bacillus sphaericus, Enterococcus avium, Enterococcus casseliflavus* and *Enterococcus durans*, and frozen samples of the isolated standard S3 microflora was deposited on Dec. 8, 1998 with the China Center For Type Culture Collection (CCTCC; Wuhan University, Wuhan 430072 P.R. China) under the Budapest Treaty and given accession number M98024.

A further aspect of the invention provides particular brine compositions, different from that of conventional methods, in having particular ingredients and ratios thereof, suitable for the growth of the microflora of the invention to produce uncooked stinky tofu. In particular, the invention provides for a brine composition particularly suitable for the fermentation of the A2 microbial group microflora, and a brine composition particularly suitable for the fermentation of S3 microbial group microflora.

A standardized brine mixture composition suitable for the fermentation of the microflora of the invention comprises cabbage or amaranth, bamboo, tofu, and salt in water. A preferred brine mixture composition suitable for the fermentation of A2 microflora comprises cabbage or amaranth, bamboo, shrimp, tofu and salt.

A brine composition particularly suitable for the fermentation of A2 microbial group preferably comprises cabbage or amaranth, bamboo, about 20–40% (w/v) tofu, about 2.5–10% (w/v) shrimp and salt. A brine composition particularly suitable for the fermentation of S3 microbial group preferably includes cabbage or amaranth, bamboo, about 30–50% (w/v) tofu and salt, but no shrimp.

A brine composition suitable for the fermentation of A2 group more preferably comprises about 20–40%(w/v) cabbage or amaranth, 10–30%(w/v) bamboo, 30% (w/v) tofu, 5% (w/v) shrimp and 0.5–1.5% (w/v) salt. A brine composition suitable for the fermentation of S3 group more preferably comprises about 20–40% (w/v) cabbage or amaranth, 10–30% (w/v) bamboo, 40% (w/v) tofu and 0.5–2% (w/v) salt. Fermentation of A2 microflora can take place in brine mixtures without shrimp.

According to the invention, the fermented aromatic stinky brine product, which is obtained from the fermentation of the particular brine ingredient mixture composition suitable for the fermentation of a microflora, by inoculation with the standard isolated microflora, can then be used to produce uncooked stinky tofu. Thus, the aromatic fermented stinky brine, which is obtained from the fermentation of the particular brine ingredient composition suitable for the fermentation of A2 or S3 microflora, by inoculation with the standard isolated A2 or S3 microflora, is used to produce uncooked stinky tofu.

Unsatisfactory results were obtained for visual, feel, smell and taste sensory preference evaluation of stinky tofu produced from stinky brine product of inoculating S3 microflora to brine ingredient mixture composition suitable for the fermentation of A2 microbial group which contain shrimp. Thus it was determined that S3 microflora is not particularly suitable for fermentation of brine composition containing shrimp.

The method of the invention for preparing stinky brine useful for the production of uncooked stinky tofu encompasses direct inoculation of the recovered frozen, or freeze-dried microflora to the brine ingredients, or inoculation of the brine ingredients after the growth of the microflora on a plate or suspension culture in suitable media, where such microflora are prepared using standard microbiology techniques for handling frozen or otherwise preserved viable samples. The methods encompass the use of a brine mixture which is first sterilized before inoculation with the microflora. The invention also encompasses fermentation in a closed style fermentation system to produce the fermented aromatic stinky brine.

The invention also provides a method for preparing uncooked stinky tofu, which uses the microflora and the brine composition of the invention. A method of the invention comprises pouring tofu (preferably cut in squares) into the fermented stinky brine produced from the microflora and brine composition of the invention; and immersing the tofu for about 0.5–12 hours, and preferably about 4–8 hours, at room temperature. The resulting uncooked stinky tofu should be washed with fresh water. The uncooked stinky tofu of the invention is suitable for the production of edible stinky tofu by such cooking methods as steaming, cooking, frying and stewing steps, preferably with soy sauce and hot sauce or pickles.

The following examples describe particular aspects of the invention, including the microflora, brine composition used for fermentation and method for preparing uncooked stinky tofu of the invention, by way of illustration and not limitation.

EXAMPLE 1

Screening and Preservation of the Microflora of the Invention

Ten samples of the stinky brines produced by conventional methods were collected from various locations in Taiwan, and two samples were produced by the inventors, as shown in Table 1. Ten mL of the collected stinky brine samples was transferred to a sterile brine medium. After fermentation at 30° C. for one month, three operators smelled the fermented brines to determine which brine has a stinky odor. The above smell sensory preference evaluation step was repeated to make sure of the production of the stinky odors. The fermented brines transferred from samples B, G and J did not produce the stinky odor. The brine media identified with a stinky odor after the fermentation were diluted and plated into TSA medium. After aerobic incubation at 30° C. for 24 hours, the bacterial microflora from each of the dilutions were scraped by loop and inoculated to another sterilized brine medium. After one month of the closed system fermentation at 30° C., the same operators smelled the fermented brines and determined which dilutions still have the stinky odor. The suitable microflora were thus decreased and the essential microflora was determined. The results are shown in Table 2.

The fermented brine inoculated with microflora at $10^3 \times$ dilution identified with a stinky odor were E, S and W. The fermented brine inoculated with microflora at $10^2 \times$ dilution identified with a stinky order were A and F. The fermented brines inoculated with microflora through dilution and plating of the samples C, D, H and I did not produce stinky orders. The desired microbial groups were preserved by freezing and re-designated as A2, E3, F2, S3 and W3.

The frozen microbial groups were activated from the frozen culture and inoculated in brine composition and subjected to the stinky odor-production test. The results are shown in Table 2. The standardized isolated microbial groups A2 and S3 produced a stinky odor after activation from frozen culture.

For identifying the species contained in A2 microbial group and S3 microbial group, the microflora were diluted and plated on TSA medium. Isolates were randomly selected after aerobic incubation at 30° C. for 2 days, and were identified by the Microbial Identification System. It found that A2 microbial group was mainly composed of *Bacillus sphaericus*, Enterococcus and Lactobacillus sp. S3 microbial group was mainly composed of *Bacillus sphaericus, Enterococcus avium, Enterococcus casselifavus* and *Enterococcus durans*.

The bacterial species which comprise A2 and S3 microbial groups are further characterized and identified using carbohydrate degradation analysis (Microstation System, Biolog, Inc., Hayward, Calif. USA), API identification system (Logan, N.A. & RCW Berkeley, Identification of Bacillus strains using the API system *J. Gen. Microbiol.* 130:1871–1884 (1995); Tillotson, GS, An evaluation of the API 20 Strep System *J. Clin. Pathol.* 35:468–471 (1982)), cell fatty acid analysis (Miller, L & Berger, J., Bacteria identification by gas chromatography of whole cell fatty acids. *HP Application Note* 288.41 (1985)), VITEK identification system (BioM'erieux Vitek, Inc. USA), and other conventional biochemical tests and the data compiled (Micro-IS system; Rogosa M., et al., Methods for coding data on Microbial Strains for Computers (edition AB) *Int. J. Syst. Bactriol.* 21:1A—184A (1971).

Particular species found in the A2 microbial group include *Bacillus sphaericus, Enterococcus gallinarum*, Corynebacterium sp., *E. faecium, Lactobacillus pentosus, L. fermentumm* and *L. casei*. The particular species found in the S3 microbial group included *Bacillus sphaericus, Enterococcus avium, Enterococcus casselifavus* and *Enterococcus durans*.

TABLE 1

The pH values, NaCl percentages and total counts of microorganisms of stinky brine samples collected in Taiwan

| Sample No. | Sampling Place | pH | NaCl % | Total Counts of Microorganisms (cfu/mL) |
|---|---|---|---|---|
| A | Wang Chi Stinky Tofu, Kuang Fu Rd, Hsinchu City | 5.72 | 1.8 | $9.0 \times 10^8$ (aerobic) $8.5 \times 10^8$ (anerobic) |
| B | Stinky Tofu Street Vendor, Chung Cheng Rd, Hsinchu City | 5.34 | 1.3 | $1.3 \times 10^8$ (aerobic) $1.3 \times 10^8$ (anerobic) |
| C | Stinky Tofu Street Vendor, Tung Hwa St., Taipei City | 5.54 | 1.9 | $5.6 \times 10^7$ (aerobic) $1.1 \times 10^8$ (anerobic) |
| D | Du Chaw Chih Chia, Kuang Chou St., Taipei | 7.72 | 1.4 | $9.0 \times 10^7$ (aerobic) $2.7 \times 10^8$ (anerobic) |
| E | Stinky Tofu Store, Lin Yi St., Taipei | 5.64 | 2.9 | $1.0 \times 10^9$ (aerobic) $1.0 \times 10^9$ (anerobic) |
| F | Ku Ting Market, Taipei | 5.20 | 1.8 | $1.3 \times 10^8$ (aerobic) $1.4 \times 10^8$ (anerobic) |
| G | Wu Miao Market, Kaohsiung | 6.12 | 1.5 | $1.4 \times 10^7$ (aerobic) $2.4 \times 10^7$ (anerobic) |
| S | South Men Market, Taipei | 6.08 | 2.2 | $1.8 \times 10^9$ (aerobic) $1.5 \times 10^9$ (anerobic) |
| W | West Men Market, Taipei | 6.85 | 7.3 | $3.1 \times 10^8$ (aerobic) $6.0 \times 10^8$ (anerobic) |
| H | Yi Yin Co., Da Pi, Yunlin | — | — | — |
| I | Conventional Stinky Brine made by inventors (1) | — | — | — |
| J | Conventional Stinky Brine made by inventors (2) | — | — | — |

TABLE 2

Results of stinky odor production at different screening steps in the process of screening microflora from stinky brine samples

| Sample No. | Transfer | Inoculation with microflora diluted and inoculated on plate (× fold dilution) | Inoculation with microflora activated from frozen culture |
|---|---|---|---|
| A | +* | + ($10^2$) | + |
| B | | | |
| C | + | | |
| D | + | | |
| E | + | + ($10^3$) | |
| F | + | + ($10^2$) | |
| G | | | |
| S | + | + ($10^3$) | + |
| W | + | + ($10^3$) | |
| H | + | + | |
| I | + | | |
| J | | | |

*The + indicates the production of stinky odor.

EXAMPLE 2

Brine Composition and Production of Stinky Brine

A brine composition suitable for the fermentation of A2 microbial group comprises about 30% (w/v) cabbage, 20%

(w/v) bamboo, 30%(w/v) tofu, 5%(w/v) shrimp and 1%(w/v) salt. A brine composition suitable for the fermentation of S3 microbial group comprises about 30%(w/v) cabbage, 20%(w/v) bamboo, 40%(w/v) tofu and 1%(w/v) salt. After the ingredients are homogenized, 200 mL brine medium (water and salt) was poured into 250 mL serum bottle and then sterilized at 121° C. for 45 minutes. Eight hundred mL of the brine medium in a 1000 mL serum bottle was sterilized at 121° C. for 60 minutes.

The microflora for fermenting the brine was activated from frozen culture. Seventy-five μl of the thawed microflora containing liquid was evenly plated on TSA (Trypticase Soy Agar (BBL, Maryland)) medium and incubated aerobically at 30° C. for 24 hours. The bacteria were scraped from the plate by loop and inoculated to the sterilized brine medium.

A closed system style fermentation was carried out at about 30° C. for one month to produce the fermented stinky brine. One of skill in the art will know that fermentation may be carried out for shorter or longer time period, or different suitable temperatures for producing aromatic fermented stinky brine.

EXAMPLE 3

Production of Uncooked Stinky Tofu

Sixty pieces of tofu squares were placed in a clean plastic case. They were immersed in 1600 mL of stinky brine at room temperature for four hours. The uncooked stinky tofu were recovered and washed with fresh water to obtain sanitary uncooked stinky tofu.

EXAMPLE 4

Sensory Preference Evaluation of Cooked Product

The uncooked stinky tofu produced from the above examples was refrigerated at 4° C. overnight, and then fried. The initial frying temperature was 150° C. A sensory preference evaluation of the cooked product was then carried out.

There were fifty sensory evaluators selected to carry out the sensory preference evaluation of the cooked product for appearance, flavor, texture and preference of stinky tofu (with pickles). The samples were randomly numbered and distributed. The results of sensory preference evaluation (evaluated on the basis of a one to nine scale where 1=highly unfavorable, and 9=highly favorable compared with commercial stinky tofu) were tabulated and treated by computer analysis by the Statistical Analysis System (SAS). The evaluation results are shown in Tables 3 and 4.

TABLE 3

Results of sensory preference evaluation for stinky tofu produced by inoculating the A2 and S3 microbial groups to brine composition containing shrimp

| Microflora | Appearance | Flavor | Texture | Preference |
|---|---|---|---|---|
| A2 | $6.28^a$ | $5.96^a$ | $6.14^a$ | $6.34^a$ |
| S3 | $5.56^b$ | $5.20^b$ | $5.62^b$ | $5.42^b$ |

$^{a,b}$The mean values with the same superscripts in each column have no significant differences.

TABLE 4

Results of sensory preference evaluation for stinky tofu produced by inoculating A2 and S3 microbial groups to brine composition not containing shrimp.

| Microflora | Appearance | Flavor | Texture | Preference |
|---|---|---|---|---|
| A2 | $6.30^a$ | $5.86^{a,b}$ | $6.04^a$ | $6.08^b$ |
| S3 | $6.36^a$ | $6.50^a$ | $6.28^a$ | $6.78^a$ |

$^{a,b}$The mean values with the same superscripts in each column have no significant differences.

Microflora corresponding to the microflora designated A2 (CCTCC accession number M98023), or a microflora corresponding to the microflora designated S3 (CCTCC accession number M98024) can be prepared from field isolates and/or culture stocks using the methods described above. Microflora corresponding to the microflora designated A2, can be characterized by the presence of the same or equivalent species of micro-organism as found in the microflora A2. Thus an equivalent microflora to A2 comprises the species of microorganism found in the A2 microbial group, which includes *Bacillus sphaericus, Enterococcus gallinarum*, Corynebacterium sp., *E. faecium, Lactobacillus pentosus, L. fermentum* and *L. casei*, but may not be the identical strain as found in A2.

Microflora corresponding to the microflora designated A2 can also be further characterized by the successful production of suitable aromatic stinky brine from a standardized brine mixture which comprises cabbage or amaranth, bamboo, 20–40% (w/v) tofu, 2.5–10% (w/v) shrimp and salt in water.

Microflora corresponding to the microflora designated S3 (CCTCC accession number M98024), can be characterized by the presence of the same or equivalent species of microorganism components as found in the microflora S3. An equivalent microflora isolate to S3 microflora comprises the species of microorganism found in the S3 microflora group, including *Bacillus sphaericus, Enterococcus avium, Enterococcus casselifavus* and *Enterococcus durans*, but not necessarily the same strain of microorganism. Microflora corresponding to the microflora designated S3 (CCTCC accession number M98024), can also be further characterized by the successful production of suitable aromatic stinky brine from a standardized brine mixture which comprises cabbage or amaranth, bamboo, 20–40% (w/v) tofu, 2.5–10% (w/v) shrimp and salt in water, and from a standardized brine mixture which comprises cabbage or amaranth, bamboo, 30–50% (w/v) tofu and salt in water.

One of ordinary skill in the art would recognize and understand that a variety of modifications can be made to the compositions and methods of the present invention without departing from the scope and spirit of the disclosure.

We claim:
1. An isolated standard microflora designated A2 deposited with the China Center For Type Culture Collection (CCTCC) under the Budapest Treaty under accession number M98023.
2. An isolated standard microflora designated S3 deposited with the China Center For Type Culture Collection (CCTCC) under the Budapest Treaty under accession number M98024.

* * * * *

UNITED STATES PATENT AND TRADEMARK OFFICE
CERTIFICATE OF CORRECTION

PATENT NO. : 6,350,606 B1  Page 1 of 1
DATED : February 26, 2002
INVENTOR(S) : Wei-Hsun Huang et al.

It is certified that error appears in the above-identified patent and that said Letters Patent is hereby corrected as shown below:

<u>Title page,</u>
Item [54], delete Title and insert

-- MICROFLORA AND BRINE COMPOSITION FOR USE IN THE PRODUCTION OF UNCOOKED STINKY TOFU (CHAW-TOFU) AND METHOD FOR PRODUCING UNCOOKED STINKY TOFU (CHAW-TOFU) --

Signed and Sealed this

Fifth Day of November, 2002

*Attest:*

*Attesting Officer*

JAMES E. ROGAN
*Director of the United States Patent and Trademark Office*